United States Patent
Fetter et al.

[15] 3,696,681
[45] Oct. 10, 1972

[54] TILT WHEEL CHAIN DRIVE

[72] Inventors: John T. Fetter, Carlisle, Ontario; Nils O. Olsson, Ancaster, Ontario, both of Canada

[73] Assignee: International Harvester Company, Chicago, Ill.

[22] Filed: Nov. 25, 1970

[21] Appl. No.: 92,628

[52] U.S. Cl. ............................74/13, 74/242.11 R
[51] Int. Cl. .........................F16h 7/12, B60k 17/28
[58] Field of Search............74/242.11 R, 13; 180/53

[56] References Cited

UNITED STATES PATENTS

| | | |
|---|---|---|
| 3,054,299 | 9/1962 | Procter................74/242.11 R |
| 3,464,282 | 9/1969 | Grobowski..................74/226 |
| 2,692,506 | 10/1954 | Hill................................74/13 |
| 2,736,015 | 2/1956 | Gilvarry et al.............74/13 X |
| 3,216,703 | 11/1965 | Walker.................180/53 R X |
| 3,402,617 | 9/1968 | Fox..................74/242.11 R X |
| 3,483,688 | 12/1969 | Hollyday.........74/242.11 R X |

*Primary Examiner*—Arthur T. McKeon
*Attorney*—Noel G. Artman

[57] ABSTRACT

An endless chain drive is provided between a driven sprocket wheel rotatable in a generally vertical plane and a driver sprocket wheel rotatable in a plane tilted from the vertical, wherein drive transmission is achieved from the tilted driver to the upright driven wheel with the cooperation of an idler wheel without dislocation of the chain.

7 Claims, 4 Drawing Figures

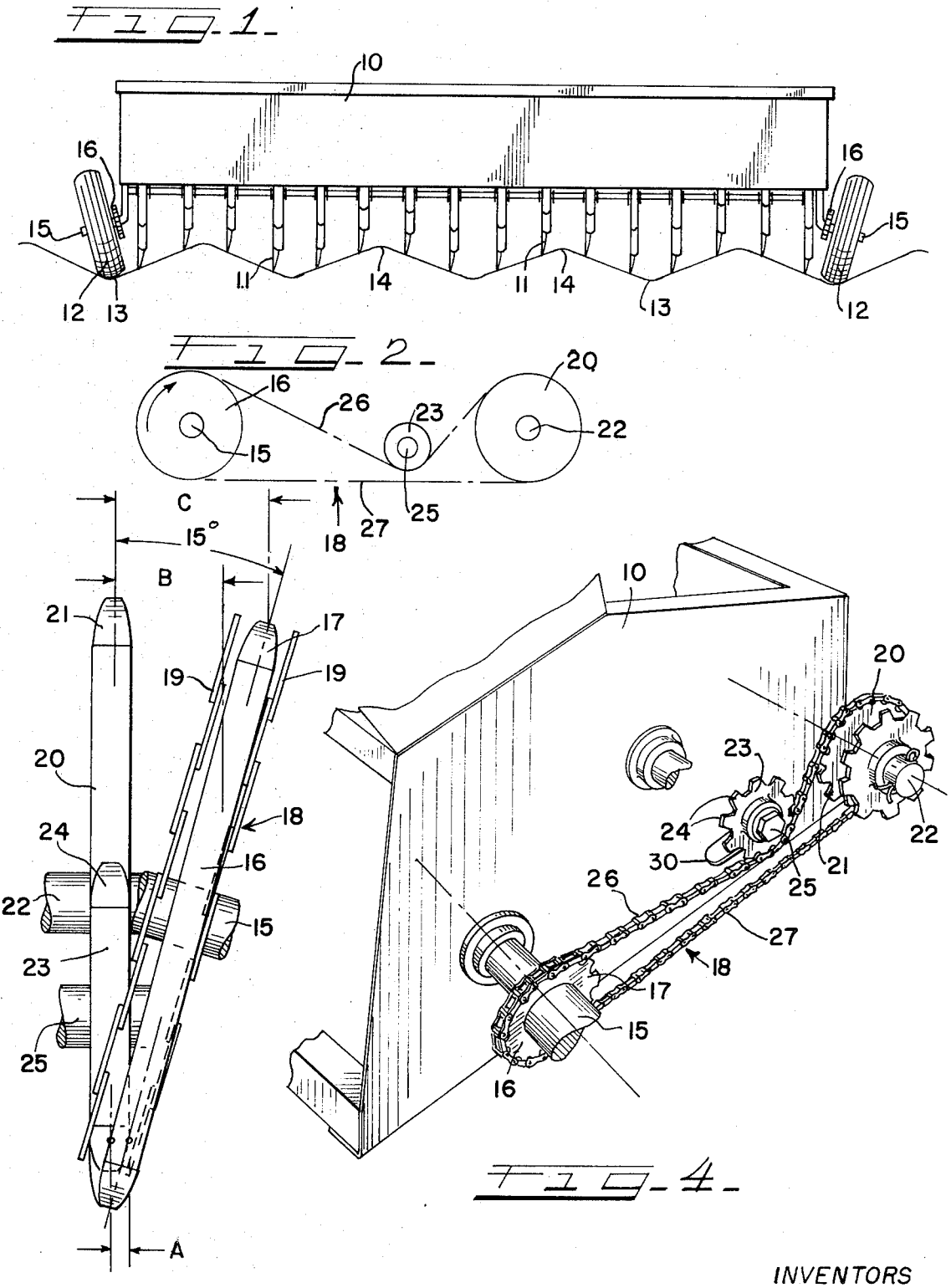

TILT WHEEL CHAIN DRIVE

BACKGROUND OF THE INVENTION

This invention relates to agricultural implements and particularly to an implement having driven parts and a ground wheel drive therefor.

In an implement such as a grain drill, an elongated seed hopper extending transversely of the direction of travel is provided with driven mechanism for metering seed and the like from the hopper and discharging it uniformly to the ground. Such an implement has a rotatable feed shaft extending lengthwise of the hopper and a plurality of metering devices to receive measured amounts of material from the hopper and rotatable with the driven shaft to discharge the material to the ground. The implement is supported at its ends by wheels, and sprocket wheels mounted on the wheel shafts are connected by drive chains to sprocket wheels mounted at the ends of the feed shaft means.

Customarily, the implement supporting wheels travel on relatively level ground and are normally disposed in vertical planes. Also, in grain drills and the like the spacing between the wheels at the ends of the seed hopper conforms to the design and width of the hopper selected for the area to be planted. However, with recent advances in irrigation and conservation practices in many areas the terrain is graded to provide a gentle slope, and is trenched to form relatively widely spaced and high beds. Water for irrigation is fed in at the high end of the slope and allowed to follow the trenches. The normal spacing between the vertical wheels of conventional drills is such that the wheels ride on the sides of the beds, causing the beds to break down and fill the trench, stopping the flow of irrigation water. To prevent this the wheels must ride in the nadir of the trenches or beds.

To solve this problem the present invention has for one of its objects the provision of an implement such as a grain drill wherein the drive wheels at the end of the machine are tilted outwardly from the vertical to decrease the spacing between the lower ground engaging portions of the wheels to cause the latter to contact the bottoms of the beds.

It is well known that positive and efficient drive transmission is achieved with sprocket wheels and chains where the axes of rotation of the driving and driven sprocket wheels are parallel and the wheels are in alignment and revolve in a common plane. It is also well known that misalignment of one sprocket wheel with respect to the other can cause dislodgement of the chain from the sprocket wheels. Special chains have been developed to transmit drive between non-aligned sprockets, however, these chains are not reliable under some conditions. Chains of this type are disclosed in the patents to Klaucke U.S. Pat. No. 2,277,915 and Tenety U.S. Pat. No. 2,455,624.

SUMMARY OF THE INVENTION

Through the subject invention drive can be transmitted between angularly spaced sprocket without dislodgement of the chain. This invention is useful in extreme situations wherein the use of chains of the type disclosed in the above mentioned Klaucke and Tenety patents do not function satisfactorily. An idler wheel is mounted to lie within the plane of the driven sprocket wheel and such that it engages the loose reach of the chain at a point close to the tight reach of the chain. A chain of the type having some clearance between the links and the rollers is used to permit twist in the chain. Tension in the chain can be varied by adjusting the idler wheel toward or away from the driven sprocket and keeping its chain engaging periphery in close proximity to the tight reach of the chain. An object of the subject invention is to provide a chain drive between sprockets spaced relatively close to each other and arranged at an extreme angle to each other.

DESCRIPTION OF THE DRAWINGS

FIG. 1 is a diagrammatic illustration of a grain drill showing the ground in profile with the tilted drive wheels disposed in the bottom of irrigation trenches;

FIG. 2 is a diagrammatic side elevational view of the sprocket wheel and chain drive of this invention;

FIG. 3 is an enlarged diagrammatic end view of the structure of FIG. 2; and

FIG. 4 is a perspective view of a detail of one end of the grain drill with one supporting wheel removed and showing the manner in which drive is transmitted to the feed shaft.

DESCRIPTION OF THE PREFERRED EMBODIMENT

The implement shown in FIG. 1 is a grain drill having a transversely elongated hopper 10 and driven dispensing means therein of a well known type for discharging material such as seed and fertilizer from outlets in the hopper to furrows formed by a plurality of furrow openers 11. Hopper 10 is supported by wheels 12, one at each end of the hopper, the wheels being tilted so that their lower inwardly directed peripheries engage the ground at the bottom of irrigation trenches 13 formed between planting beds 14.

Each wheel 12 is mounted on an outwardly and downwardly inclined axle 15 to which is also secured a driver sprocket wheel 16 having teeth 17 and around which is trained an endless drive chain 18, having relatively widely spaced links 19, and which is also trained around a vertically disposed sprocket wheel 20 having teeth 21 and secured to the end of a horizontal feed shaft 22, which extends lengthwise of the hopper.

It may be noted that the area at the end of a grain drill or the like is small and that the driver and driven sprocket wheels 16 and 20 are necessarily relatively closely spaced. Thus, it should be clear that, were sprocket wheels 16 and 20 connected in a conventional manner by chain 18 the misalignment between the wheels would force the chain to become dislocated and to run off either the driver or the driven wheel. For example, were the chain 18 to be run between the driving and driven sprocket wheels 16 and 20 without the intervention of an idler wheel, the extent of misalignment would be as indicated at C in FIG. 3. The function of a conventionally placed idler wheel is merely to engage the chain and deflect it sufficiently to tighten it, or take out the slack, and the misalignment might be as indicated at B in FIG. 3, and in either case the chain would run off either the driver or the driven sprocket. This problem is solved in the following manner:

As will be clear from FIG. 3, the lower peripheral portion of sprocket wheel 16 is disposed in alignment in a common plane with wheel 20. Driving sprocket wheel 16 is tilted outwardly approximately 15° from this vertical plane, as indicated in FIG. 3, and revolves in the direction of the arrow in FIG. 2. In order to avoid dislocation of the drive chain and to transmit positive and uninterrupted drive from sprocket wheel 16 to sprocket wheel 20, an idler wheel 23 having teeth 24 is mounted on a stub shaft 25 on the end of the hopper between sprocket wheels 16 and 20.

Chain 18 is relatively long and idler shaft 25 is mounted on the hopper below a center line between axle 15 and feed shaft 22, as indicated in FIG. 2, the idler engaging upper reach 26 of the drive chain and substantially deflecting it toward lower reach 27. As will be observed from FIGS. 2, 3 and 4, the idler is closely adjacent the lower reach or tight side 27 of the chain and the driven sprocket wheel 20, and in FIG. 3 it will be noted that idler 23 is in longitudinal alignment with and in the same vertical plane as sprocket wheel 20 and the lower peripheral portion of driver sprocket wheel 16.

It has been discovered that with the idler 23 arranged as shown in the drawings, misalignment in the slack strand of the chain is minimized, the degree of misalignment being indicated at A in FIG. 3. The lower reach 27 of the drive chain travels in a straight line between sprocket wheel 20 and the lower periphery of driver sprocket wheel 16, and with the latter revolving in the direction of the arrow in FIG. 2, the upper reach 26 of the chain travels with a minimum lateral deflection indicated in FIG. 3, from the upper periphery of wheel 20 to idler 23, transmitting positive and uninterrupted drive between the driving and driven sprocket wheels.

As indicated in FIG. 4 tension in chain 18 can be varied by adjusting idler wheel 23 along a mounting slot 30 formed in the hopper wall. Slot 30 lies parallel to the lower reach 27 of the chain to thus maintain the spacing between the low point of the upper reach 26 and the lower reach 27.

What is claimed is:

1. Means for transmitting drive to one sprocket wheel from another sprocket wheel rotatable in a plane tilted from the plane of rotation of said one sprocket wheel comprising, an endless chain extending between and trained around said wheels, an idler wheel disposed between said sprocket wheels and engageable with one reach of the chain between said sprocket wheels and having its chain-engaging periphery disposed closely adjacent the other reach of said chain between said sprocket wheels and wherein one peripheral portion of said another sprocket wheel is in alignment with the plane of said one sprocket wheel and said idler wheel is a relatively small sprocket wheel rotatable in the plane of and in alignment with said one sprocket wheel.

2. The invention set forth in claim 1, wherein the axis of said idler wheel is disposed between the axis of said one sprocket wheel and said other reach of said chain between said sprocket wheels.

3. In a mobile implement having a horizontal driven shaft and spaced supporting wheels at least one of which is tilted from a vertical plane, a driven sprocket wheel mounted on said shaft and rotatable in a vertical plane, a driver sprocket wheel mounted on said tilted supporting wheel in misaligned relation to said driven sprocket wheel, an endless drive chain trained around said sprocket wheels, and means mounted on the implement between said sprocket wheels and operatively engageable with said chain for maintaining the driving relation between said chain and said sprocket wheels unimpaired.

4. The invention set forth in claim 3, wherein one peripheral portion of said driver sprocket wheel is in longitudinal alignment with the vertical plane of said driven sprocket wheel.

5. The invention set forth in claim 4, wherein the first reach of said chain extending between said one peripheral portion of said driver sprocket wheel and said driven sprocket wheel is maintained taut by the driving action and wherein said means engageable with said chain is an idler sprocket wheel engagable with the other reach of said chain to deflect the latter to a position closely adjacent said first reach of said chain.

6. In a mobile implement having a shaft, a driven sprocket wheel mounted on the shaft for rotation in a vertical plane, a driver sprocket wheel longitudinally spaced from the driven sprocket wheel for rotation in a plane tilted from the vertical and having a lower peripheral portion disposed in the plane of said driven sprocket wheel, an endless chain trained around and having a lower reach extending between the lower peripheral portions of said sprocket wheels and an angled upper reach extending between the upper peripheral portions of said sprocket wheels, and an idler wheel mounted on the implement in the vertical plane of said driven sprocket wheel and engageable with the upper reach of said chain and having its lower peripheral portion closely adjacent said lower reach of said chain.

7. The invention set forth in claim 6, wherein the implement is supported by a ground engaging wheel mounted on an axle angled downwardly from the horizontal and said driver sprocket wheel is mounted on said axle and driven by said ground engaging wheel.

* * * * *